May 2, 1939.   C. W. GOODWIN ET AL   2,156,811
METHOD AND APPARATUS FOR SEALING CAPPED CONTAINERS
Filed Oct. 2, 1937   6 Sheets-Sheet 1

INVENTORS
Carl W. Goodwin
BY Ransom J. Daniels
ATTORNEY

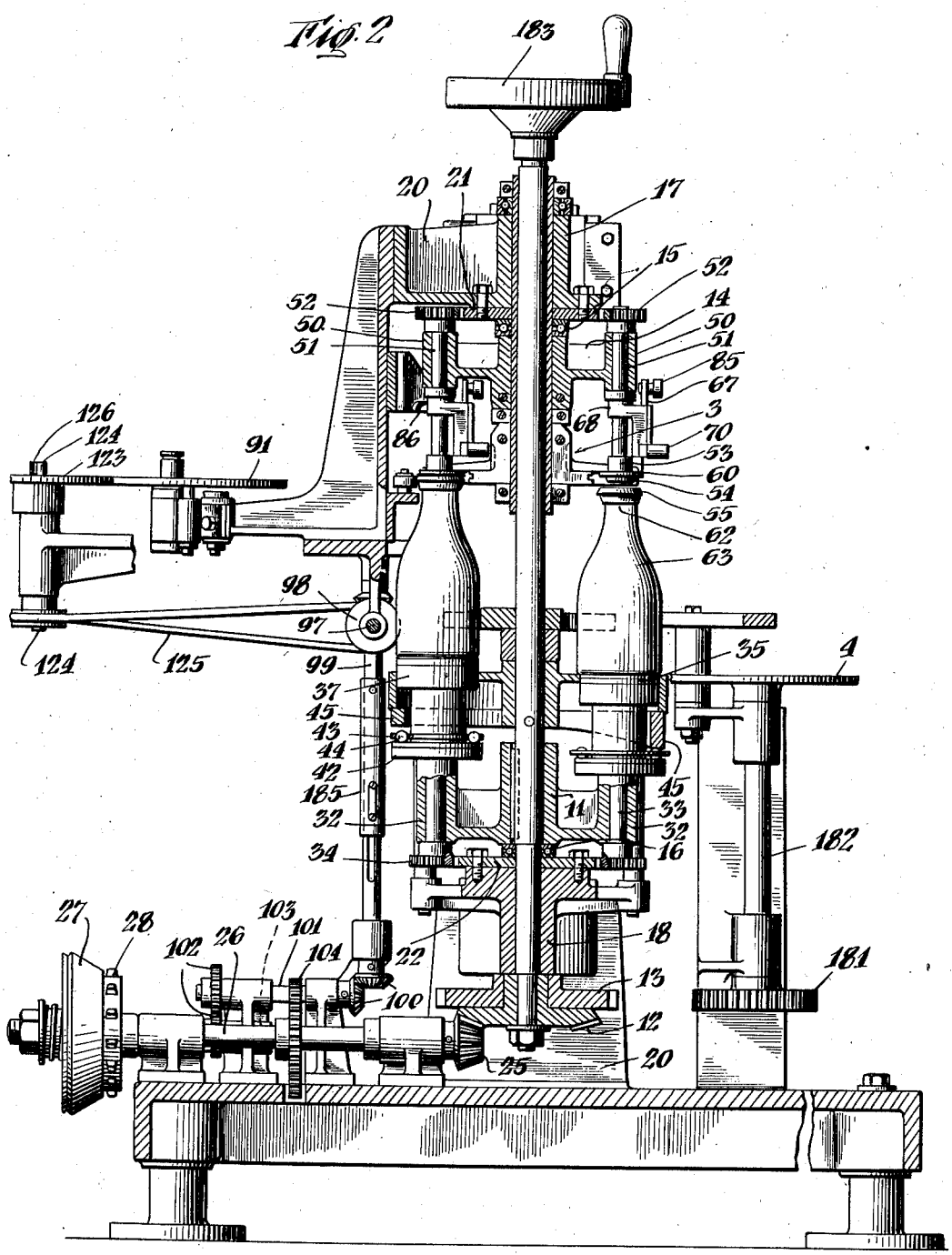

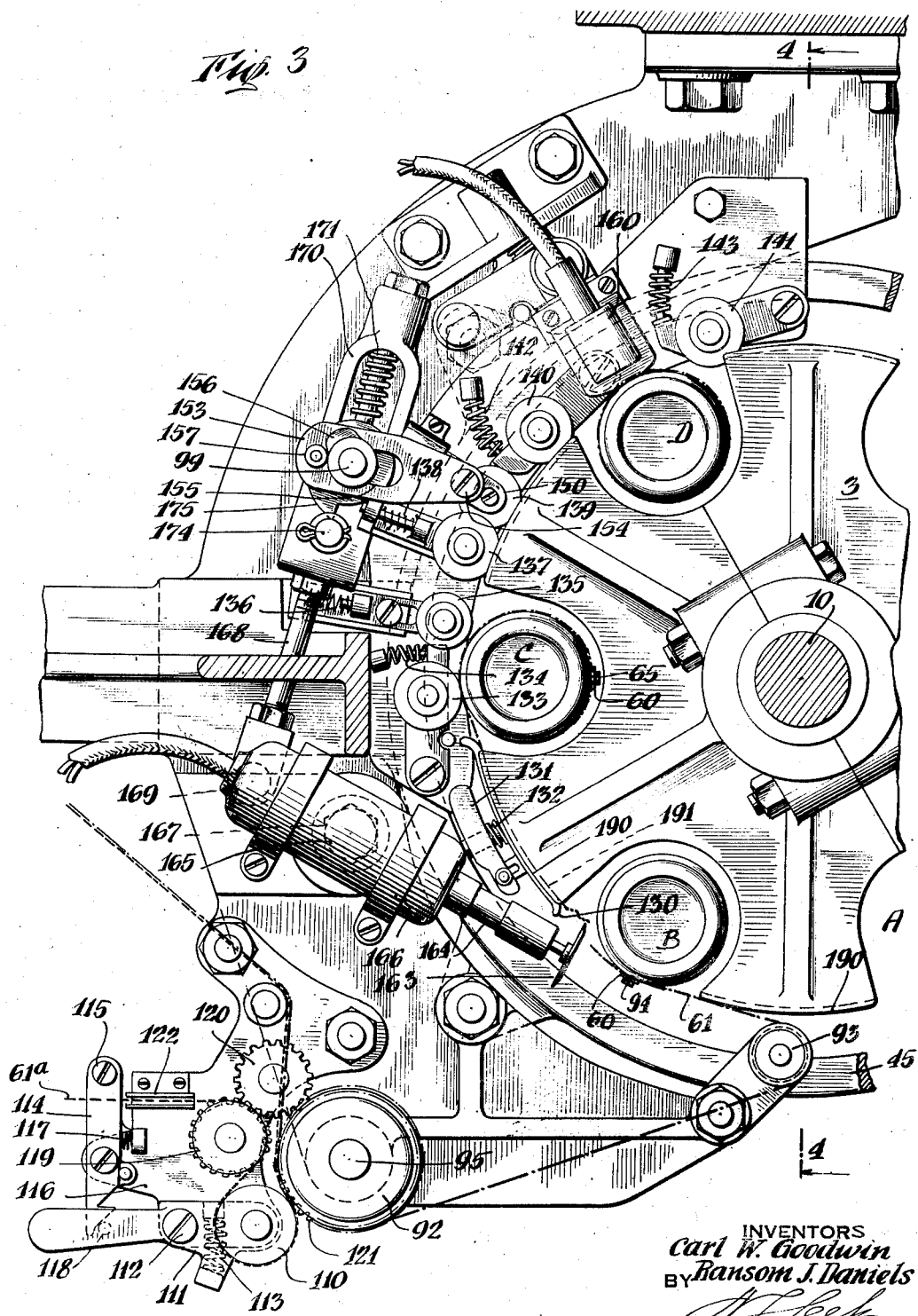

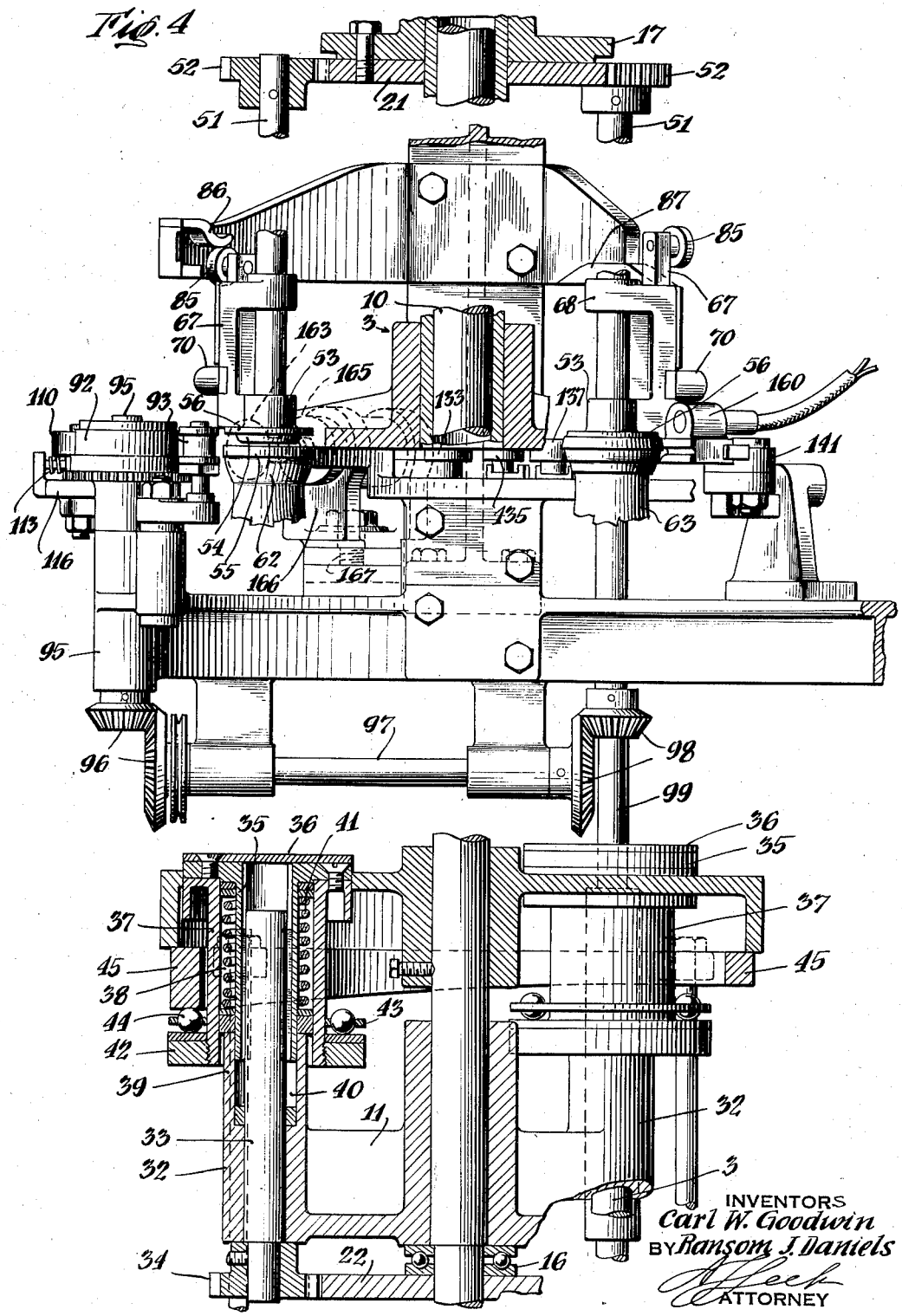

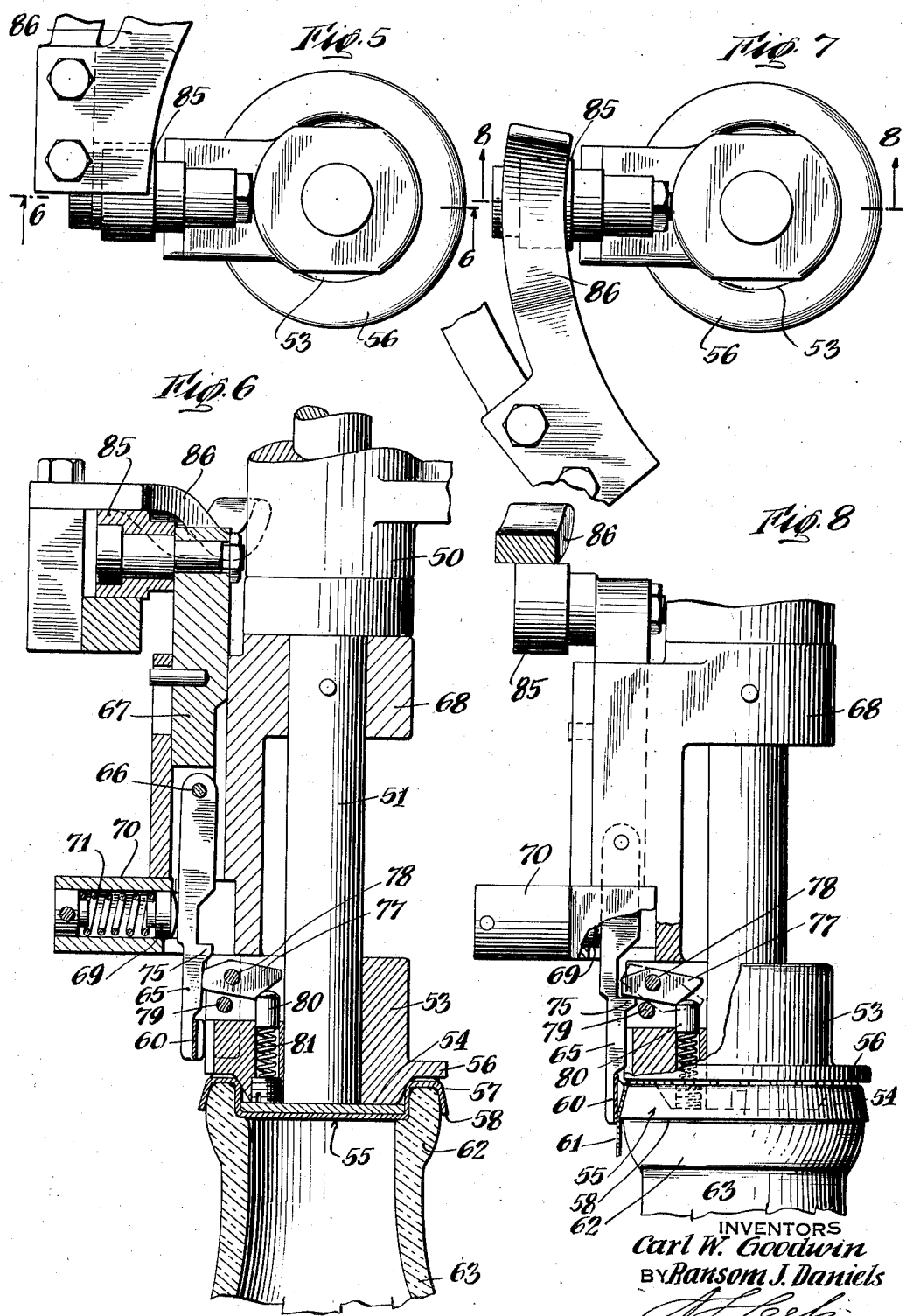

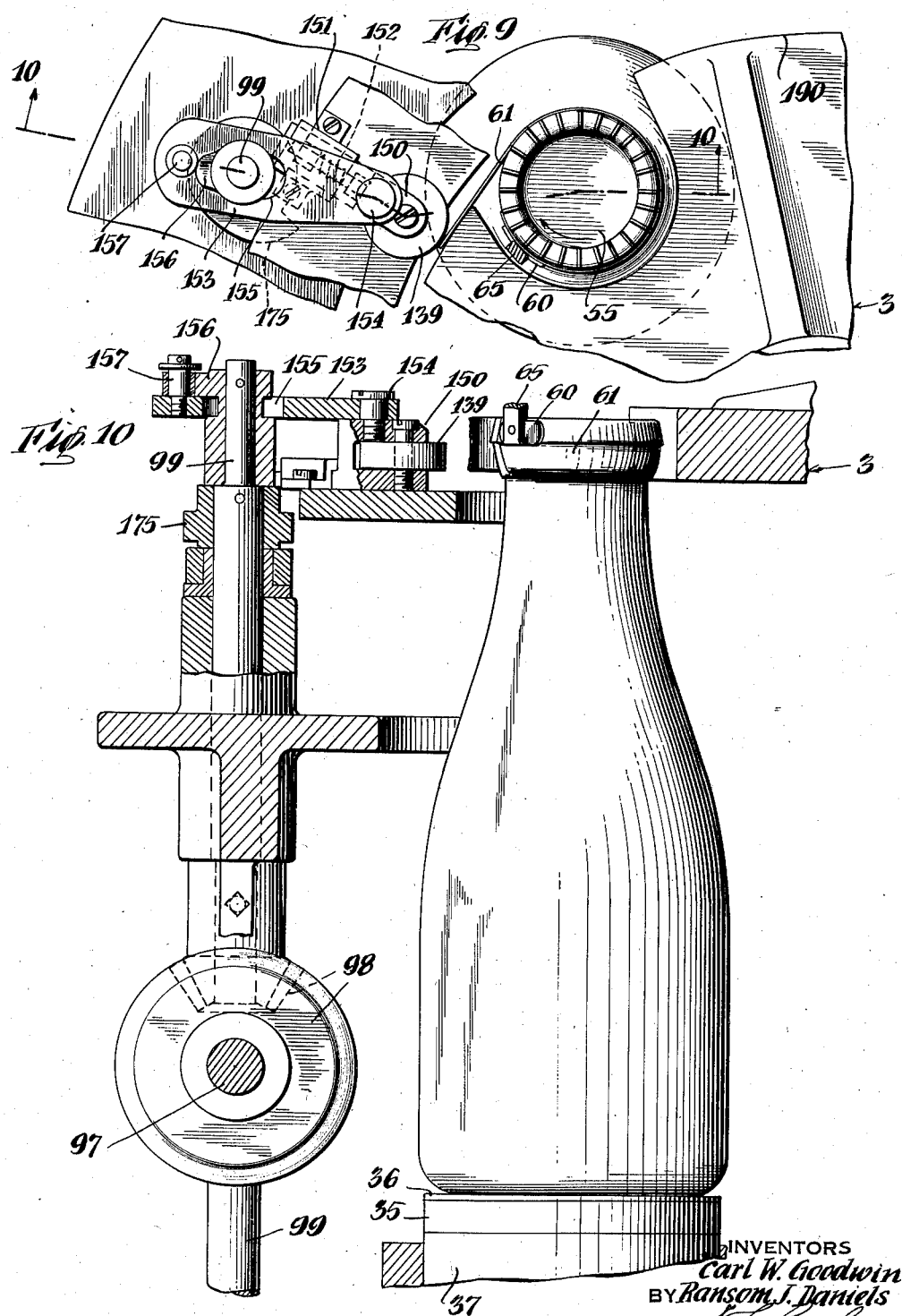

Patented May 2, 1939

2,156,811

UNITED STATES PATENT OFFICE 2,156,811

METHOD AND APPARATUS FOR SEALING CAPPED CONTAINERS

Carl W. Goodwin, Plainfield, N. J., and Ransom J. Daniels, Whitestone, N. Y., assignors to American Seal-Kap Corporation of Delaware, Wilmington, Del., a corporation of Delaware Application October 2, 1937, Serial No. 166,986

24 Claims. (Cl. 216—21)

This invention relates to a method and apparatus for sealing capped containers.

The invention provides a novel and improved means for applying a sealing strip for sealing the cap to the capped container. In the embodiment shown for purposes of illustration, the invention has been applied to sealing a milk bottle cap or the like of the cover-all type, for example, a cap of the type disclosed in the Baum Patent No. 1,668,349 dated May 1, 1928. This cap comprises a centrally depressed bore covering portion and a pouring lip housing attached thereto and provided with an outer skirt which extends over the outer face of the pouring lip of the bottle. The machine is particularly designed to apply a flexible sealing strip in a position to overlap the outer skirt of the cap and the adjacent portion of the outer surface of the bottle. The flexible strip may be made of a suitable sealing material, such as rubber or rubber composition or other suitable sheet material and is preferably sufficiently adhesive so that the overlapping portions thereof may be readily sealed by pressure or by heat and pressure, with or without moistening, as the strip is wound around the neck of the bottle.

An object of the invention is to provide a novel and improved device of the type above specified.

Another object is to provide an improved means for applying a tamper proof seal to a milk bottle cap or the like.

Another object is to provide a machine which operates automatically to seal a row of bottles as they are received from the capping machine.

Various other objects and advantages will be apparent as the nature of the invention is more fully disclosed.

Although the novel features which are believed to be characteristic of this invention are pointed out more particularly in the claims appended hereto, the invention itself may be better understood by referring to the following description, taken in connection with the accompanying drawings, in which a specific embodiment thereof has been set forth for purposes of illustration.

In the drawings:

Fig. 2 is a transverse section through the machine taken on the line 2—2 of Fig. 1;

Fig. 3 is an enlarged detail view showing the pressure rollers, cutter and associated mechanism;

Fig. 4 is a section taken on the line 4—4 of Fig. 3;

Fig. 5 is a plan view of the gripper in its elevated position;

Fig. 6 is a section taken on the line 6—6 of Fig. 5;

Fig. 7 is a plan view of the gripper in its lower position;

Fig. 8 is a section taken on the line 8—8 of Fig. 7;

Fig. 9 is a top plan view of the band release mechanism;

Fig. 10 is a section taken on the line 10—10 of Fig. 9; and

Figure 1:
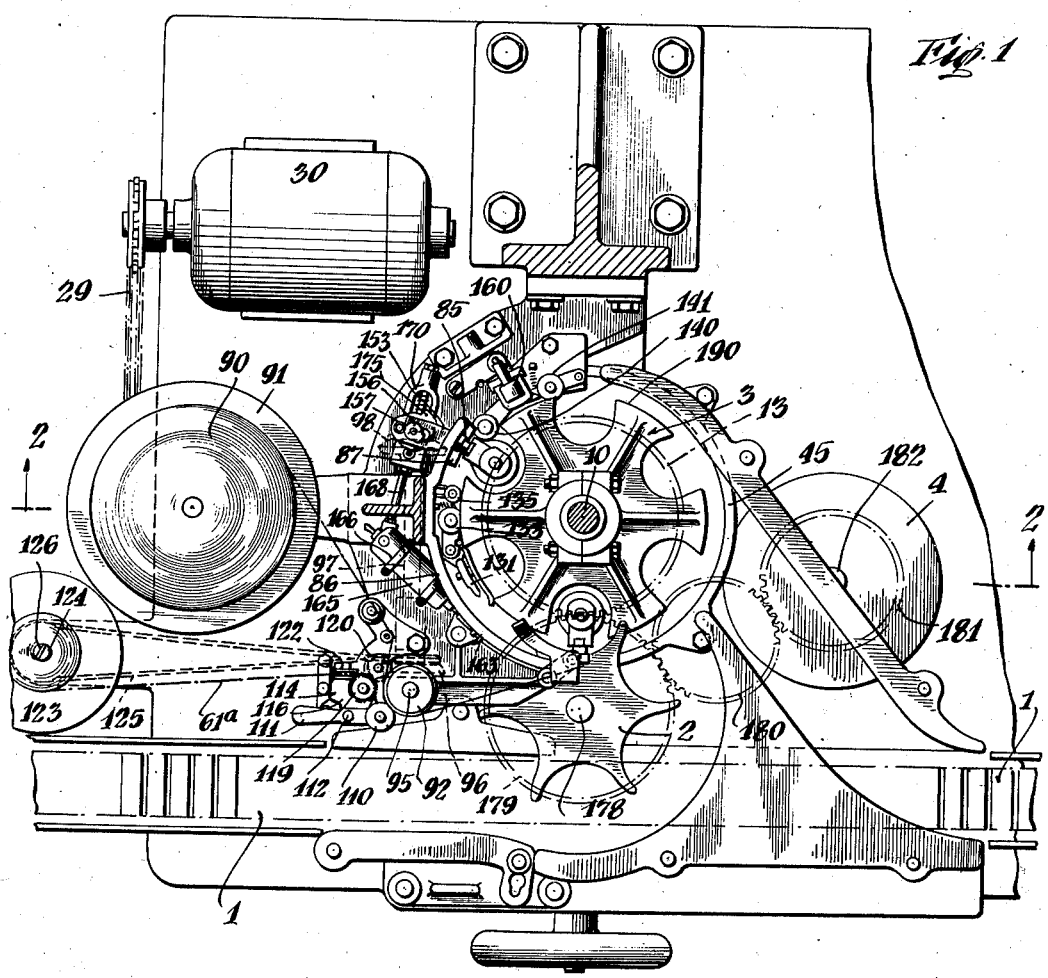
Fig. 1 is a top plan view partly in section of a machine embodying the present invention.

Referring more particularly to the embodiment of the invention shown in the drawings, the mechanism is shown in Fig. 1 as comprising a traveling conveyor 1 on which a row of bottles are fed from the capping machine (not shown) into the path of the rotating star wheel 2 by which they are removed from the conveyor and fed to a revolving turret 3 where the sealing band is applied thereto in the manner to be described. The bottles are discharged from the turret 3 and are fed by a rotating feed plate 4 to the conveyor 1 which carries them to a suitable packing or refrigerating station. The conveyor 1 may constitute the usual conveyor by which the bottles are fed from the capping machine, the entire mechanism being positioned over an appropriate intermediate part of said conveyor. If the sealing device is not to be used in any particular case, it may be readily removed from feed position in which case the bottles are fed directly from the capping machine to the storage or refrigerating station in the usual manner.

The turret 3 and associated mechanism, as more clearly shown in Fig. 2, comprises a vertical shaft 10 carrying the turret 3, a bottle support bracket 11, a driven gear 12, a star wheel driving gear 13 and a top bracket 14 carrying the clamping heads to be described. The shaft 10 is supported by thrust bearings 15 and 16 and is mounted in stationary bearing supports 17 and 18 which are attached to the frame 20 in any convenient manner. The bearing support 17 carries a stationary spur gear 21 for rotating the clamping heads, to be described, and the bearing support 18 carries a stationary spur gear 22 for driving the bottle supports. The gear 12 is driven by a beveled gear 25 from a shaft 26 which is driven through a clutch 27 by a sprocket 28 engaging a chain 29 (Fig. 1) which is driven by any suitable source of power, such as a motor 30.

Bottle supports

The bracket 11 carries a plurality of bearing members 32 (Figs. 2 and 4) in each of which a shaft 33 is journaled. Each shaft 33 carries a gear 34 meshing with the stationary gear 22 above mentioned. A sleeve 35 carrying a plate 36 constituting the bottle support, is keyed to the shaft 33 for rotation therewith, but is free to slide axially thereof. An outer sleeve 37 is spaced from the sleeve 35 to form a recess 38 in which a flange 39, formed on the bearing member 32, slides. A recess 40 is formed in the bearing member 32 to receive the sleeve 35. A spring 41 is seated within the recess 38 and tends to hold the sleeve 35 and bottle support 36 in their upper position. The sleeve 37 carries a bearing ring 42 on which is mounted a ball race 43 carrying a plurality of balls 44. These balls are adapted to engage the lower edge of a stationary cam 45 which is designed to cause the sleeve 35 and bottle support 36 to be retracted as shown at the left in Fig. 4 or to be elevated as shown at the right in Fig. 4 at suitable positions of the turret.

In general, the bottle support 36 is retracted to receive or release the bottle, but is released when the bottle is applied thereto so as to clamp the bottle between the support 36 and the clamping head to be described. It is to be noted, however, that during the entire rotation of the bracket 11, the supports 36 are rotated by means of the spur gear 34 and the stationary gear 22.

Clamping head

The bracket 14, as shown in Fig. 2, carries a plurality of bosses 50 in each of which a shaft 51 is journaled. Each shaft 51 carries a pinion 52 meshing with the stationary gear 21 for driving the shaft 51 as the turret is rotated. The shafts 51 carry at their lower ends a clamping head 53 (Fig. 6) having a central tapered portion 54 which is adapted to engage the depressed bore covering portion of the cap 55 to hold and center the bottle and having a lip 56 which extends over the pouring lip housing 57 of the cap to firmly clamp the bottle against the support 36. The arrangement is such that the bottle is firmly clamped between the rotating clamping head 53 and the rotating support 36 during the entire period while the sealing strip is being applied thereto.

The clamping head 53 carries a gripper 60, shown in detail in Figs. 5 to 8 which is adapted at appropriate times to grip the sealing strip 61 as shown in Fig. 8 and securely hold the same in the correct position overlapping outer skirt 58 of the pouring lip housing 57 and the outer surface of the neck 62 of the bottle 63. This gripper 60 is carried by a finger 65 which is pivotally mounted, as at 66, to a slide 67 which slides on a bracket 68 attached to the shaft 51. A spring pressed detent 69 slides in a boss 70 carried by the bracket 68 and is held by a spring 71 in engagement with the finger 65. The detent 69 normally tends to hold the gripper 60 in gripping position. The finger 65 is provided with a projection 75 which engages a pawl 77 to cause the finger 65 to swing outwardly against the tension of the spring 71 when the sleeve 67 is moved downwardly in the manner to be described. When the sleeve reaches its lower position as shown in Fig. 8, the projection 75 snaps past the lower edge of the pawl 77, thereby permitting the finger 65 to be moved inwardly due to the action of the spring 71 and causing the gripper 60 to engage the sealing tape 61. The pawl 77 is pivoted at 78 for a movement which is limited by a pin 79. When the sleeve 67 is again moved upwardly, the pawl 77 pivots to the position shown in the dotted lines in Fig. 8, causing the projection 75 to swing the finger 65 outwardly and release the gripper 60 from the tape 61. When the projection 75 has passed the end of the pawl 77 it again snaps inwardly to the position shown in Fig. 6. The pawl 77 is normally held in the position shown in Fig. 6 by means of a pin 80 held in a recess 81 in the clamping head 55 and bearing against the end of the pawl 77. The arrangement is such that a snap action is produced insuring that the sleeve 67 and finger 65 reach their extreme positions either upwardly or downwardly when they are shifted by the mechanism to be described.

For shifting the sleeve 67, a roller 85 is provided which is adapted to engage the under surface of a stationary track 86 (Figs. 4 and 6) located at the position where the sleeve is to be depressed for clamping the tape. This roller engages the upper surface of a cam 87 when the sleeve is to be elevated for releasing the tape. These cams 86 and 87 are disposed at the proper position for timing the action of the gripper 60 for gripping and releasing the tape at the selected points in the cycle.

Tape feed

The sealing tape 61 is fed from a roll 90 which may be mounted on a suitable support 91 (Fig. 1) around a drive roller 92 (Figs. 1 and 3) and an idler 93 to a position to be engaged by the bottle cap as at 94 (Fig. 3). The tape drive roller 92 is mounted on a shaft 95 and is driven by the beveled gears 96 (Fig. 4) from an idler shaft 97. This idler shaft 97 is driven by beveled gears 98 from a secondary drive shaft 99. This drive shaft 99 is driven by beveled gears 100 (Fig. 2) from an idler shaft 101 which is driven by gears 102 from a second idler shaft 103 having a gear meshing with a driving gear 104 on the shaft 26. A presser roller 110 holds the tape in driving engagement with the roller 92. This presser roller 110 is shown as mounted on a bracket 111 which is pivoted at 112 and is held against the roller 92 by a spring 113. The roller 110 may be latched out of engagement with the roller 92, as for threading the tape by a latch 114, pivoted at 115 to a frame 116 and held by a spring 117 in engagement with a pin 118 on the bracket 111.

In certain instances the tape 61 may be provided with a covering 61a, such as paper, which must be stripped from the tape before the tape is used for sealing the bottles. For this purpose a paper feed roller 119 is provided which is driven by idler gear 120 from a gear 121 carried by the shaft 95. A pair of guide plates 122 are provided to direct the paper from the roller 119 to a take-up reel 123 (Fig. 1). The reel 123 is mounted on a shaft 124 and is driven by a belt 125 (Fig. 2) from the shaft 97. The shaft 124 may have a slot 126 (Fig. 1) to receive the end of the paper strip. The paper strip 61a is passed around the presser roller 110, thence around roller 119 and between the guide plates 122 to the take-up reel 123. It has been found that a static charge accumulates on the paper which causes it to adhere to any adjacent part of the machine unless it is held under tension by a feed mechanism such, for example, as that above described.

After the tape 61 has been clamped to the container as indicated at the point 94 in Fig. 3, the continued rotation of the turret feeds the container with the tape attached thereto past a pressure gate 130 which is pivotally mounted on a bracket 131 and is held by a spring 132 in pressure engagement with the tape. The gate 130 thus presses the tape firmly on to the cap and bottle neck and causes it to conform thereto. As the turret advances, the tape is progressively wrapped around the container and is successively pressed thereagainst by an idler roller 133 which is actuated by a spring 134, by an idler 135 which is actuated by a spring 136, by an idler roller 137 which is actuated by a spring 138, by a retractible idler roller 139 and with idler rollers 140 and 141 which are actuated by springs 142 and 143, respectively. The idler rollers 133, 135, 137, 140 and 141 are mounted on suitable sliding or pivoted brackets for the above purpose. The idler rollers 137 and 139 are thinner than the width of the tape and are overlapped to hold the tape to the cap and container, respectively. The section of the gripper 60 is so timed that it releases when between the rollers 137 and 139 and passes over the top of the latter.

The retractible roller 139 is mounted on a bracket 150 (Fig. 9) which is slidably mounted in a guide 151 and is held normally in pressure engagement by the tape with a stiff spring 152. For retracting the roller 139, a lever 153 is provided which is pinned to the bracket 150 by a pin 154. The lever 150 is provided with an elongated slot 155 (Fig. 10) through which the shaft 99 extends. The shaft 99 is provided with a cam 156 which engages a roller 157 mounted on the lever 153 and is adapted to cause reciprocating movement of the lever 153 as the shaft 99 rotates. This movement of the lever 153 causes a corresponding sliding movement of the bracket 150 and retracts the roller 139 from the tape. The cam 156 is timed to release the roller 139 from the tape after the gripper 60 has been raised, so that the tension on the end of the tape is released and the tape is not pulled out of place on the container before the final sealing takes place.

Figure 11:
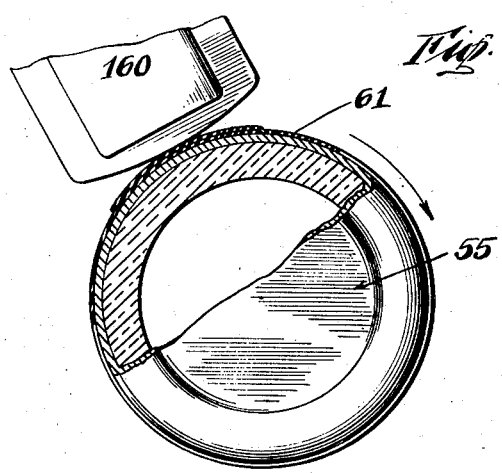
Fig. 11 is a detail view showing the heating station.

In certain instances it is desirable to apply heat to the sealing band, particularly when a thermoplastic binding agent is relied upon for the sealing. For this purpose, an electrical heating unit 160 (Figs. 3 and 11) is provided in a position to engage the overlapping ends of the sealing tape as the containers pass this station. The heating unit 160 may be of any desired type and it is to be understood that this unit may be omitted provided heat is not required for the sealing operation.

In order to cut the sealing band, a cutting disk 163 is provided which is mounted on a shaft 164 and driven by suitable means such as a motor 165. The entire assembly may be mounted on a bracket 166 which is pivoted as at 167. For swinging the bracket 166 so as to control the position of the cutting disk 163, a link 168 is provided which is pinned to the bracket 165 by pin 169 and at the other end is provided with a yoke 170 which passes over the shaft 99 and is normally held by a spring 171 in a position to retract the cutting disk 163 from the tape. The link 168 is provided with a pin 174 which is engaged by a cam 175 attached to the shaft 99 and rotating therewith. This cam causes the cutting disc 163 to be swung into engagement with the tape at the proper point in the cycle. A shoe 190 is formed on the turret 3 between each pair of bottle supports, having a recessed surface 191 in which the gate 130 seats and on which the various rollers rest to hold the trailing part of the tape under the necessary tension after it has been cut by the disc 163.

The star wheel 2 is mounted on a shaft 178 which carries a gear 179 (Fig. 1) driven from the gear 13 attached to the shaft 10. The gear 179 also drives an idler gear 180 meshing with a gear 181, driving a shaft 182 (Figs. 1 and 2), carrying the feed plate 4. The entire clamping head may be mounted on a bracket (not shown) which is adjusted as to elevation by means of a hand wheel 183 (Fig. 2) so as to vary the elevation of the clamping head in accordance with the size of the container. To permit this adjustment, the bracket 14 is loosely mounted on the shaft 10 and is adapted to be clamped in any adjusted position. The shaft 99 is also provided with an extensible coupling 185 (Fig. 2) which permits this shaft to be extended in accordance with the position of the clamping head.

*Operation*

In the operation of this device, the bottles which are fed along the conveyor 1 are engaged by the star wheel 2 and fed thereby to the rotating turret 3, at a position corresponding approximately to position A of Fig. 3. The cam 45 is so arranged that at this point the bottle support 36 is in lowered position. As soon as the bottle has been deposited upon the support 36, however, the cam 45 releases the bottle support and permits the same to be raised by the action of the spring 39, thereby bringing the top of the bottle into engagement with the clamping head 53 as shown in Fig. 6. At this point, the gripper 60 is in elevated position as shown in Fig. 6 and does not interfere with the proper positioning of the bottle between the support 36 and the clamping head 53. Inasmuch as the support and clamping head are both continuously rotated by the gears above described, the bottle is continuously rotated as it is advanced in the turret. The turret then advances the bottle to a position indicated at station B in Fig. 3. At this point the bottle comes in contact with the tape which has been fed under tension from the roll 90, over the tape drive 92, and the idler roller 93 and extends to the preceding bottle which has now been advanced to the station C in Fig. 3. As the bottle engages the tape in the station B, the cam 86 depresses the sleeve 67 thereby bringing the gripper 60 into engagement with the tape as shown in Fig. 8 and firmly clamping the tape against the cap 55. The cam 175 now engages the roller 174 to shift the link 168 and the bracket 166 so as to bring the rotating cutting disk 163 into engagement with the tape, thereby severing the tape between the container in station B and the container in station C and at a point slightly in advance of the gripper 60 on the former. The container in station B now continues to rotate as it is advanced by the rotating turret and in so doing causes the tape to be wrapped therearound. As the tape is wrapped around the rotating container, it is stretched and caused to conform to the contour of the cap and container. As the latter advances progressively past the pressure member 130, and the various rollers 133, 135, 137, 139 and 140, the tape is firmly pressed against the container and cap. When the container reaches the station C, the tape is partly wrapped therearound as shown in Fig. 3 and is held under tension by the friction gate 130 and shoe 190. At this point the succeeding container reaches the station B, is engaged by the tape and the tape is severed by the action of the cutting disk 163 in the manner above described. The tape is now held under tension by the gate 130 and the various rollers successively engaging the shoe 190. When the container reaches a point opposite the idler roller 139, it has made substantially a complete revolution and the forward end of the tape is being overlapped by the trailing end. At this point the cam 87 raises the gripper 60 for releasing the forward end of the tape while the tape is held in position by the roller 139. After the container passes the roller 139 the latter is retracted before it registers with the shoe 190 so as to release the pressure on the end of the tape and prevent it from being pulled off of the container. The tape is now pressed against the container by roller 140. As the container is further advanced to reach the station D in Fig. 3, the heater 160 comes into contact with the overlapped ends of the tape and effects a permanent seal. The tape is further engaged by the roller 141 when the bottle is again advanced beyond the heater. Thereafter the container is released and discharged from the turret on to the rotating feed plate 4 and thence to the conveyor 1.

While the invention has been specifically shown as applied to a machine for applying a sealing tape to milk bottles, it is to be understood that the device may be used for sealing any container. The continuously rotating bottle support and clamping head cause the bottle to be rotated in the desired manner without danger of slipping or otherwise interfering with the proper action of the tape. The gripper 60 is moved axially with only a small swinging movement so that it can remain in contact with the forward end of the tape until this end has been overlapped by the trailing end of the tape. The gripper can thus be removed from between the two overlapping portions of the tape just before the completion of the sealing operation. The construction, accordingly, permits the gripper to remain in contact with the tape throughout substantially a complete revolution of the bottle, thereby preventing the tape from slipping after the gripper has been removed and before the two ends of the tape are brought into overlapping position. After the tape has been severed by the cutting member 163, it is held under tension by the pressure gate 130 and the shoe 190 as it is wrapped around the bottle and is further pressed against the bottle by the various rollers 133, 135, 137, 139, 140 and 141 as the turret advances. It is to be understood that these rollers may be made of soft material and may be formed in general to the contour of the bottle and cap. Furthermore, the pressure may be adjusted as desired by varying the tensions of the various springs. If moisture is required to render the tape adhesive, suitable moistening means may be provided in a position to engage the overlapping portions of the tape, that is in a position corresponding generally to that of the roller 139. When a heat fusible adhesive is used, the heater 160 serves to effect a permanent seal. This heater would also serve to drive the moisture from a tape which had been previously moistened.

The cam 45 is adapted to retract the bottle support 36 after the bottle has been completely sealed, thereby releasing the bottle and permitting the same to be discharged on to the rotating feed plate 4. It is to be understood that the feed mechanism may be varied as desired. The clamping head may be mounted for free rotation if it is found that the bottles are suitably driven by means of the bottle supports 36. Conversely, the bottle supports 36 may be made to rotate freely if the proper driving force is obtained by the rotating clamping heads 53.

The particular type of cutting disk shown has been found to operate satisfactorily. It is to be understood, however, that a stationary knife or a heated wire can be used for this purpose if desired. The heater 160 may be mounted to be retracted when not in registration with the bottle or may be adjustably mounted so that it can be permanently held out of contact with the bottle when heat is not required. In some instances, it may be desirable to use the heater 160 for the ironing action thereof so as to assist in obtaining the desired seal even in the absence of a heat fusible material.

It is to be understood that the sealing tape is preferably so formed that the overlapping ends are adhesively secured while the tape itself does not adhere to either the bottle or the cap. An embossing roller may also be used to emboss a name, such as the name of the dairy, on the sealing band. This has the further advantage that the band cannot be tampered with without destroying the name so embossed thereon. For this purpose the roller 140 or the roller 141 may be provided with a suitable die on the periphery thereof.

Although a specific embodiment of the invention has been shown for purposes of illustration, it is to be understood that various changes and modifications may be made therein as will readily appear to a person skilled in the art. The invention is only to be limited in accordance with the following claims when interpreted in view of the prior art.

What is claimed is:

1. The method of applying a flexible strip to successive containers of a continuously advancing row of containers which comprises bringing the strip into contact with a first container, advancing and rotating said first container to wrap the strip therearound while holding the strip under tension, advancing a second container into contact with the strip thus held under tension by the first container, clamping the strip to said second container, severing the same in advance of the clamping point, continuing the rotation of the first container to wrap the severed strips therearound until the two ends are in overlapping relationship, sealing the two ends to each other and repeating the operation with successive containers.

2. The method of applying a flexible strip to successive containers in a continuously advancing row of containers which comprises bringing the strip into contact with one of the containers, advancing and continuously rotating the container to wrap the strip therearound, bringing the following container into engagement with the strip, clamping the strip thereto, severing the strip between the two containers and further advancing both of said containers while rotating the same to complete the application of the flexible strip thereto.

3. The method of applying a flexible strip to successive containers in a row of containers which comprises continuously rotating and advancing each of said containers, engaging the strip by a first container to cause the same to be wrapped therearound and prior to the completion of the wrapping movement, engaging the strip by a second container, clamping the strip thereto and severing the strip between said containers.

4. The method of applying a flexible strip to a container which comprises continuously rotating and advancing said container, causing said container to engage said strip and applying pressure to the strip by successive stationary pressure means as the container is advanced, for holding the strip under tension and pressing the same against said container.

5. The method of sealing a capped container which comprises holding an end portion of a stretchable sealing strip in overlapping relationship to the cap and container, rotating the container to stretch the strip and wrap the same therearound and, prior to the completion of the wrapping movement, advancing a second rotating container into contact with the strip, securing the strip thereto and severing the strip between said containers.

6. The method of sealing a capped container which comprises holding an end portion of a stretchable sealing strip in overlapping relationship to the cap and container, rotating the container to stretch the strip and wrap the same therearound, and releasing the holding means only after the ends of the strip have been brought into overlapping relationship.

7. The method of sealing a capped container which comprises holding an end portion of a stretchable sealing strip in overlapping relationship to the cap and container, rotating the container to stretch the strip and wrap the same therearound, and releasing the holding means only after the ends of the strip have been brought into overlapping relationship and releasing the tension on said tape when said holding means is released.

8. A machine of the class described comprising a continuously moving carrier, means feeding capped containers successively to said carrier, means continuously rotating said containers as they are advanced by said carrier and means engaging the rotating containers to apply sealing material in position to seal the caps thereto.

9. A machine of the class described comprising a continuously movable carrier, means feeding capped containers successively thereto, means continuously rotating said containers as they are fed along by said carrier, means applying the end of a strip of flexible material in over-lapping relationship to the periphery of the capped containers whereby the strip is stretched and wound about said cap and container by the advancing and rotating movement of said container, means causing a second container to engage said strip prior to the completion of the wrapping thereof around said first container and means securing said strip to said second container and severing the strip between said containers.

10. A machine of the class described comprising a continuously movable carrier, means feeding capped containers successively thereto, means continuously rotating said containers as they are fed along by said carrier, means applying the end of a strip of flexible material in overlapping relationship to the cap and container of a capped container whereby the strip is stretched and wound about said cap and container by the advancing and rotating movement of said container, means causing a second container to engage said strip prior to the completion of the wrapping thereof around said first container, means securing said strip to said second container and severing the tape between said containers, and means sealing the overlapping ends of said tape on each of said containers.

11. A machine of the class described comprising a rotating turret, a plurality of container supports carried by said turret, means continuously rotating said container supports, a continuously rotating clamping head in alignment with each of said container supports, means retracting said container supports to receive a container and releasing the same to cause the container to be clamped between the rotating support and clamping head, means winding a flexible strip material around the container while so clamped and means retracting the container support to release the container after said strip has been applied thereto.

12. A machine of the class described comprising a continuously rotating turret having a plurality of rotating container supports adapted to receive and rotate successive containers of a row as they are advanced by said turret, means feeding a stretchable strip material to a first container as it is advanced in said turret, means securing the end of the strip to said container whereby the strip is wrapped therearound due to the rotation of said container, means causing a second container to engage said strip prior to the completion of said wrapping operation, means clamping the strip to said second container and severing the strip between said containers whereby continued rotation of the first container winds the strip entirely therearound, and means sealing the overlapping ends of the strip on said first container.

13. In a machine of the class described, means continuously advancing a rotating container, means securing a flexible strip material thereto comprising a clamp rotatable with said container, a plurality of pressure means holding the strip under tension as it is wrapped around the container, means releasing the clamping means after the ends of the strip have been brought into overlapping relationship and means releasing the tension on the strip when the clamping means is released.

14. In a machine of the class described, means continuously advancing a rotating container, means securing a flexible strip material thereto comprising a clamp rotatable with said container, a plurality of spaced pressure means positioned to successively engage the tape as the container is advanced for pressing the same against said container, means releasing the clamping means after the ends of the strip have been brought substantially into overlapping relationship.

15. In a machine of the class described, means continuously advancing a rotating container, means securing a flexible strip thereto comprising a clamp rotatable with said container, a plurality of spaced pressure means positioned to successively engage the strip as the container is advanced for pressing the same against said container, means releasing the clamping means after the ends of the strip have been brought substantially into overlapping relationship and a heater positioned to engage the overlapped ends as the container is advanced for heating the overlapped ends to sealing temperature.

16. In a machine of the class described, a continuously rotating turret, a plurality of container supports carried thereby, a clamping head in alignment with each of said container supports adapted to clamp a bottle against said support a gripper carried by each of said clamping heads to engage a flexible strip material and hold the same against the periphery of said container, spaced means for raising or lowering said gripper and cam means to move the gripper out of contact with the container during the vertical movement thereof.

17. A gripper comprising a finger extending longitudinally in a position to engage and hold a strip material against the periphery of a container, means shifting said finger axially to release or grip the strip and cam means holding the finger out of contact with the container during the shifting movement.

18. A vertically moving finger adapted to grip a strip material for holding the same against the periphery of a container or to release said strip, cam means adapted to cause vertical movement of said finger for the above purpose and means for producing a snap action whereby the gripper is caused to rapidly complete its movement in either direction.

19. The method of sealing a capped container which comprises holding a portion of a sealing strip in overlapping relationship to the cap and container, rotating the container to wrap the strip therearound, releasing the holding means only after the ends of the strip have been brought into overlapping relationship and sealing the overlapping ends of the strip to each other.

20. The method of sealing a capped container with a sealing strip having thermoplastic adhesive characteristics which comprises holding a portion of said strip in overlapping relationship to the cap and container, rotating the container to wrap the strip therearound, releasing the holding means only after the ends of the strip have been brought into overlapping relationship and sealing the overlapping ends of the strip to each other by heat and pressure.

21. The method of sealing a capped container which comprises holding a portion of a stretchable sealing strip in overlapping relationship to the cap and container, rotating the container to stretch the strip and to cause the same to conform to the contour of the cap and container, releasing the holding means only after the ends of the strip have been brought into overlapping relationship and sealing the overlapping ends of the strip to each other.

22. The method of applying a flexible strip to a container which comprises clamping a portion of said strip to said container, rotating the container to wrap the strip therearound, releasing the clamping means only after the ends of the strip have been brought into overlapping relationship and sealing the overlapping ends of the strip to each other.

23. A machine of the class described comprising a continuously rotating turret, a plurality of container supports carried by said turret, means continuously rotating said container supports with respect to said turret, a continuously rotating clamping head in alignment with each of said container supports, a support carrying said clamping heads and rotating in synchronism with said turret, means clamping a container between said container support and said clamping head whereby the container is continuously advanced by said turret and is simultaneously continuously rotated by said container support, means winding a flexible strip material around the container while so clamped and means releasing the container after said strip has been applied thereto.

24. A machine of the class described comprising a continuously rotating turret, a plurality of container supports carried by said turret, means continuously rotating said container supports with respect to said turret, a continuously rotating clamping head in alignment with each of said container supports, a support carrying said clamping heads and rotating in synchronism with said turret, means clamping a container between said container support and said clamping head whereby the container is continuously advanced by said turret and is simultaneously continuously rotated by said container support, means winding a flexible strip material around the container while so clamped until the ends of said strip material are brought into overlapping relationship, means sealing the overlapping ends of said strip to each other and means thereafter releasing the container from said container supports.

CARL W. GOODWIN.
RANSOM J. DANIELS.